(No Model.)
P. MERCIER.
METHOD OF REPAIRING PNEUMATIC TIRES.
No. 557,851. Patented Apr. 7, 1896.
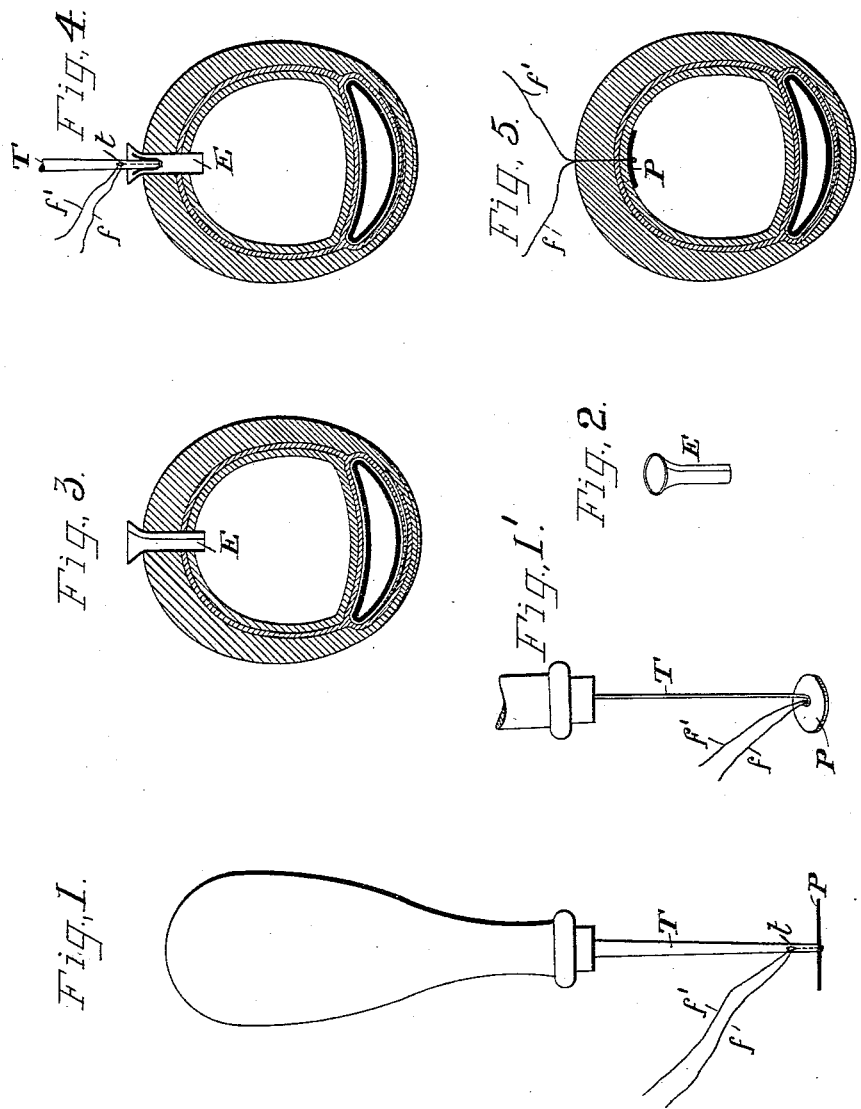
Witnesses
Inventor.
Pierre Mercier
by Pollok & Mauro his attorneys.

UNITED STATES PATENT OFFICE.

PIERRE MERCIER, OF PARIS, FRANCE, ASSIGNOR, BY MESNE ASSIGNMENTS, TO THE NEW YORK BICYCLE EQUIPMENT COMPANY, OF NEW YORK.

METHOD OF REPAIRING PNEUMATIC TIRES.

SPECIFICATION forming part of Letters Patent No. 557,851, dated April 7, 1896.

Application filed January 10, 1896. Serial No. 574,989. (No model.) Patented in France September 27, 1892, No. 224,584.

*To all whom it may concern:*

Be it known that I, PIERRE MERCIER, a citizen of France, and a resident of No. 23 Rue des Moines, Paris, in the Republic of France, have invented a new and useful Improvement in Processes of and Appliances for Repairing Pneumatic Tires, (patented in France, No. 224,584, dated September 27, 1892,) which improvement is fully set forth in the following specification.

I have embodied my invention in an appliance called a "kit," by means of which I am enabled to put in place in the interior of a rubber tire accidentally perforated, and without dismemberment or removal of the tire, a rubber patch or disk coated on one side with a sticking or adhesive substance, so as to prevent escape of the compressed air.

To illustrate the manner in which the invention is or may be carried into effect, I have shown in the accompanying drawings the various appliances and mode of using the same.

Figure 1 of said drawings is a side view of the obturating-disk mounted upon the tool by means of which it is introduced in the tire. Fig. 1' is another form of tool having a smaller diameter, and shows that the form of this tool may be varied. Fig. 2 is a tube preferably split longitudinally and enlarged at its upper end. Fig. 3 is a section of a tire through which the tube is inserted. Fig. 4 exhibits in vertical section the tire, the split tube, and tool in the act of introducing the path or disk; and Fig. 5 is a vertical section of the tire, from which the tube and tool have been withdrawn, with the patch left behind drawn up in place.

When in the course of use it is noticed that the pneumatic tire has been injured by some cause and that it has become leaky, it may, by means of the kit which contains the above-named appliances, be readily repaired by proceeding in the manner as follows: Introduce into the wound of the tire, either by hand or by means of a pointed instrument therein inserted, forming a wedge or spreader, the tube E, the lower end of which may be beveled to further facilitate introduction. Take then one of my obturating-disks P. This is composed of rubber or other fabric, to the center of which are secured one or two or more threads $f\ f'$. These latter I pass through the central orifice or core of the tool T and out of the eye $t$. The disk may be preliminarily coated upon its upper face with rubber cement, and it will there stick to the end of the tool T, but is certainly held in place upon the end of the tool by the strings or threads, which the operator may seize with his fingers or may twist around the tool. The tool with its patch may now be introduced through the tube E until the patch clears the lower end of the tube, which may be split to facilitate the passage of the patch, as already before said. The tool T is now withdrawn, allowing the strings $f\ f'$ to slide through the eye of the tool. If these strings are now taken hold of for the purpose of drawing up the patch with its adhesive face toward the wound, it will adhere to the interior of the tire, hermetically closing the wound.

To perfect the tightness of the tire, it is only necessary, if the internal pressure of air be not sufficient, to pump fresh air into the tire to the required tension.

The threads may be cut or not at pleasure.

Prior to my invention the repair of punctures in pneumatic tires has been most generally effected by means of a headed plug or stopper, familiarly known as a "mushroom." The principle of operation of such device is that of an ordinary plug or stopper, its efficiency depending absolutely upon the accuracy and tightness of the fit of the plug or stopper in the perforation. In these devices the head of the mushroom serves simply as a means of preventing the plug being blown out by the force of the compressed air, the function of stopping the leak being performed by the plug. It follows that, in the application of the mushroom-stopper, it is essential that the hole be shaped and sized preliminarily to insertion of the plug to secure an accurate fit. It also follows that the walls of the hole are subject constantly to a strain, due to the compression of the plug, tending to rupture the material of which the tire is composed. For the latter reason, mainly, the mushroom-patch can be used only upon single-tube tires, since the presence of a compressed plug in the thin web of pure rubber composing the inner tube would quickly split the latter, causing more damage than it remedies. The double-tube tire is far superior to and in every way more serviceable than the single-tube tire, which retains a place on the market solely for the reason that it is capable of quick repair by the mushroom-plug. Another objection to the mushroom-plug is that it cannot be successfully used when a second puncture occurs close to the first. All these difficulties and objections are overcome by my invention, which has for its main object to do away with the plug-stopper and with enlarging the puncture, and to close the latter solely by means of a thin diaphragm applied on the interior of the tire. This device, as already indicated, is applicable to double-tube tires.

In this specification and claims it is to be understood that the term "disk" is used in contradistinction to a plug, mushroom, or any device which acts, in closing the leak, by reason of a stem plugging the puncture.

Having thus described my invention, what I claim as new, and desire to secure by Letters Patent, is—

1. The method of expeditiously repairing pneumatic tires accidentally wounded or injured from other leak-determining cause, by introducing into the interior of the tire a flat, impervious, adhesive disk, and applying the same over the puncture, the edges of the latter being brought together, substantially as described.

2. The method of repairing punctures in pneumatic tires, by introducing temporarily into the puncture a funnel-shaped tube, passing through said tube to the interior of the tire a flat adhesive disk or diaphragm, removing the tube and allowing the edges of the puncture to come together, and applying the disk or diaphragm over the puncture, substantially as described.

In testimony whereof I have signed this specification in the presence of two subscribing witnesses.

PIERRE MERCIER.

Witnesses:
CLYDE SHROPSHIRE,
GEORGE R. OSTHEIMER.